US008820266B2

(12) United States Patent
Chibras et al.

(10) Patent No.: US 8,820,266 B2
(45) Date of Patent: Sep. 2, 2014

(54) METHOD AND SYSTEM FOR AQUACULTURE

(75) Inventors: David Chibras, Mexico City (MX); Daniel Russek, Mexico City (MX); Kevin M Fitzsimmons, Tucson, AZ (US); Wilfrido Contreras, Mexico City (MX); Shmuel Appelbaum, Mexico City (MX)

(73) Assignee: Maricultura Vigas S.A.P.I. de C.V., Mexico City (MX)

( * ) Notice: Subject to any disclaimer, the term of this patent is extended or adjusted under 35 U.S.C. 154(b) by 0 days.

(21) Appl. No.: 13/406,091

(22) Filed: Feb. 27, 2012

(65) Prior Publication Data
US 2013/0055960 A1 Mar. 7, 2013

Related U.S. Application Data

(60) Provisional application No. 61/447,293, filed on Feb. 28, 2011.

(51) Int. Cl.
*A01K 61/00* (2006.01)

(52) U.S. Cl.
USPC ........................................... 119/226; 119/215

(58) Field of Classification Search
USPC ......... 119/200, 203–207, 209–211, 213–218, 119/224–228, 234, 236
See application file for complete search history.

(56) References Cited

U.S. PATENT DOCUMENTS

| 405,713 | A | | 6/1889 | Lugrin et al. |
| 3,473,509 | A | | 10/1969 | Miyamura |
| 3,495,572 | A | | 2/1970 | Groves |
| 3,773,014 | A | | 11/1973 | Ewald |
| 4,003,337 | A | | 1/1977 | Moore |
| 4,182,267 | A | * | 1/1980 | Kominami et al. ........... 119/226 |
| 4,213,421 | A | | 7/1980 | Droese et al. |
| 4,738,220 | A | * | 4/1988 | Ewald, Jr. ..................... 119/202 |
| 4,913,093 | A | * | 4/1990 | VanGorder ................... 119/224 |
| 5,038,715 | A | | 8/1991 | Fahs |
| 5,353,745 | A | | 10/1994 | Fahs |
| 5,762,024 | A | * | 6/1998 | Meilahn ........................ 119/223 |
| 5,947,057 | A | * | 9/1999 | Perez et al. ................... 119/211 |
| 5,961,831 | A | * | 10/1999 | Lee et al. ....................... 210/614 |

(Continued)

OTHER PUBLICATIONS

Tian, X. et al., An experimental study on closed-polyculture of penaeid shrimp and tilapia and constricted tagelus, Aquaculture 202 (2001) 57-71.

(Continued)

*Primary Examiner* — Trinh Nguyen
(74) *Attorney, Agent, or Firm* — Roylance, Abrams, Berdo & Goodman, L.L.P.

(57) ABSTRACT

An integrated multi-trophic aquaculture system (multico) for a primary species, preferably a carnivorous marine species with high market value, secondary, preferably an omnivorous species of medium market value and tertiary species, preferably a detrivorous species with high market value, combined with an unfolding system for the primary species to an open semi-intensive or extensive system, the multico system for the primary species is an intensive closed or semi-closed system. The secondary species is stocked in an intensive closed or semi-closed system, while the tertiary species is stocked in a semi-intensive or closed extensive or semi-closed system. The multico system of the primary species is in communication with the system of the secondary species, while the system of the secondary species is in communication with the system of the tertiary species.

9 Claims, 4 Drawing Sheets

(56) References Cited

U.S. PATENT DOCUMENTS

| | | | |
|---|---|---|---|
| 6,192,833 B1* | 2/2001 | Brune et al. | 119/204 |
| 6,615,767 B1* | 9/2003 | Untermeyer et al. | 119/215 |
| 7,174,850 B2* | 2/2007 | Hsiao | 119/204 |
| 7,287,488 B2* | 10/2007 | Taylor et al. | 119/219 |
| 8,141,515 B2* | 3/2012 | Nien | 119/226 |
| 2003/0106499 A1* | 6/2003 | Yamada | 119/207 |
| 2004/0107914 A1* | 6/2004 | Untermeyer et al. | 119/215 |

OTHER PUBLICATIONS

Wang, J.Q. et al., Experimental studies on polyculture in closed shrimp ponds. I. Intensive polyculture of Chinese shrimp (*Penaeus chinensis*) with tilapia hybrids, Aquaculture 163 (1998) 11-27.

* cited by examiner

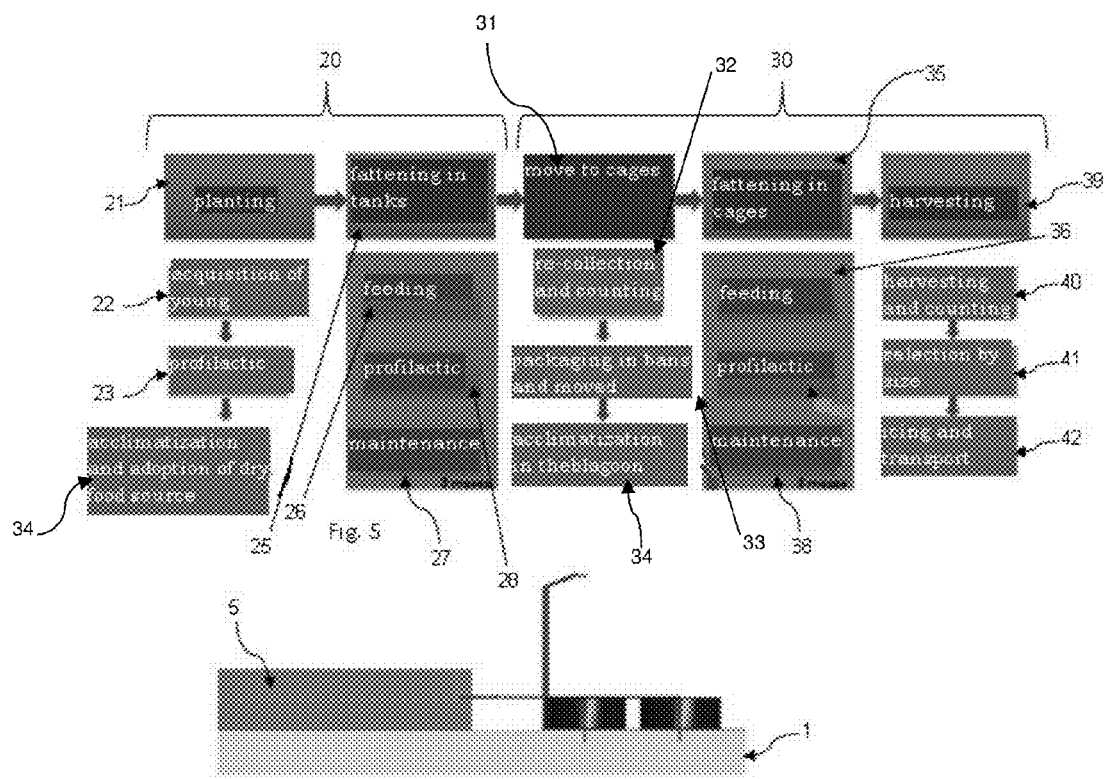
Fig. 5
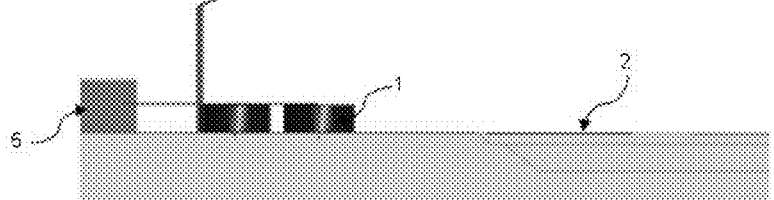
Fig. 6
Fig. 7

METHOD AND SYSTEM FOR AQUACULTURE

CROSS-REFERENCE TO RELATED APPLICATION

This application claims the benefit of provisional application Ser. No. 61/447,293, filed on Feb. 28, 2011.

FIELD OF THE INVENTION

The present invention is related to a system and method for preserving and growing out a primary species, with its subsequent unfolding, and a secondary and tertiary species through aquaculture. Specifically, the present invention is related to a system and method for growing out different species, in which at least one first species is reared through an integrated multi-trophic aquaculture system and an unfolding system into cages of said first species, and at least two species are reared through integrated multi-trophic aquaculture, all within the same system.

DESCRIPTION OF RELATED ART

Aquaculture is being increasingly used for growing out and harvesting aquatic species in a variety of uses such as food, re-population of aquatic resources and species control in certain environments. The increasing use of aquaculture is due to the worldwide demand for water-dwelling species. Aquaculture production in 1970 was estimated to make up 3.9% of world total production, and in 2004 it increased to 32.4%. Aquaculture is still growing faster than other animal-raising industries, at an average rate of 8.8% a year since 1970, whereas the nearest growing rate is that of farmland meat production, which has an average rate of 2.8% a year. Each region has distinct species productions. For example, China is focused on cyprinids (Carp), while the rest of Asia is focused on marine fish with high commercial value; in the United States of America, production is focused on siluriformes (Catfish), while in Canada it is more focused on Salmo (Salmon) production.

Several aquaculture systems are known and managed for a variety of situations such as farming or life support in natural or man-made environments. Usually, aquatic systems are classified as closed or open systems. Open systems are epitomized by natural environments such as lakes, lagoons, streams or the sea (in which production systems are called mari-culture). Closed systems can be semi-closed systems, such as outdoor fish ponds, in which a portion of the water mass output can be recycled for the clean water input for the same pond, but the system is subject to natural environments. Totally closed systems, such as an aquarium, are not subject to natural environments. Regardless of the system being used, the survival and optimal growth of an organism is directly related to its environment and nutrition. In closed systems, the organism must be monitored and regulated all the time in order to provide the optimal parameters for its survival. Even in open systems, the removal of contaminants and waste materials from the system is traditionally required in order to guarantee the organism's viability. Also, aquaculture can be grouped into two categories: extensive and intensive. An extensive aquaculture system is a production system characterized by a low degree of control (e.g. of environment, nutrition, predators, competitors, disease agents), low initial costs, low-level technology, low production efficiency and high dependence on local climate and water quality, use of natural water bodies (e.g. lagoons, bays, embayments) and of natural, often unspecified food organisms. On the other hand, an intensive aquaculture system is characterized by a high degree of control, high initial costs, high-level technology, high production efficiency, tendency towards increased independence of local climate and water quality, and use of man-made culture systems.

Most aquaculture production of fish, crustacean and mollusk comes from freshwater environments. Mariculture, defined as the cultivation, management and harvesting of marine organisms in their natural habitat, traditionally in tropical countries, or in specially constructed rearing units, contributes to the total production in smaller amounts, although mariculture is now growing at increasing rates due to the prominence of high-value crustaceans and finfish. This increase has resulted in more intensive practices and they now focus in species with higher commercial attractiveness. Global aquaculture development is at a crossroads with many critical aspects of sustainability that need to be addressed. For instance, with the increasing growth in use of intensive aquaculture, comes the tendency to introduce alien species, use more intensively formulated feeding regimes and administration of chemicals for the control or management of diseases.

Aquaculture systems are mainly monocultures. Multiple systems and methods have been devised for monocultures in aquaculture, such as U.S. Pat. Nos. 3,495,572, 3,773,014, 4,003,337, 4,213,421, 5,038,715 and 7,174,850. These patents present methods, systems and devices for monoculture aquaculture, i.e. the farming of one kind of aquatic organisms or species.

Poly-cultures are also important for aquaculture too, and they have been presented in numerous publications, such as U.S. Pat. No. 5,353,745, Tian et al., "An experimental study on closed-poly-culture of penaeid shrimp with tilapia and constricted tagelus", Aquaculture Research Laboratory Fisheries College, Ocean University of Qingdao, Feb. 3, 2001, and Wang et al., "Experimental studies on poly-culture in closed shrimp ponds, Intensive poly-culture of Chinese shrimp (*Panaeus chinensis*) with tilapia hybrids", Ocean University of Qingdao, Nov. 30, 1997. Traditionally, poly-culture is implemented in extensive freshwater systems or in mari-culture systems; more precisely, it is usually carried out in areas larger than 100 hectares. Area agglomeration rarely exceeds 10,000 specimens by hectare. The production of shrimp in these systems ranges from approximately fifty to several hundreds of kilos/hectare/year.

On the other hand, integrated aquaculture is a system which shares, among other things, resources, water, food and management with other activities such as agriculture or agro-industries. Integrated culture systems are those in which sub-systems outputs, in other circumstances considered waste material, are inputs for another sub-system, resulting in a higher than expected output efficiency of sea/land area products under farm control. Integrated agriculture has been widely practiced by small farms in freshwater environments, usually in Asia, as shown in Tian et al. and Wang et al. aforementioned. A review of integrated aquaculture was carried out by the FAO in 2001, in which technologies ranging from integrated grass-fish and embankment-fish systems, seasonal ponds and ditches, livestock-fish integration of chicken, duck and pig-based systems, rice-fish systems, included a few examples in coastal areas with shrimp and prawn in freshwater areas. In recent years, the idea of integrated aquaculture has been considered as a mitigation effort against the excess of organic/nutrients matter generated by intensive agriculture activities. Integrated aquaculture system structure can vary according to variables such as localization, season, species and social environment, so a system or solution which works correctly in some place may not be implemented in a different place. There are examples of integrated aquaculture in the art, e.g. U.S. Pat. Nos. 405,713 and 3,473, 509. FIG. 1 presents an example of an integrated aquaculture system from previous art, where on a first stage (A) multiple species are stocked in a tank, cage or pond; on a second stage (B) aquaculture system is split into land and water, differentiated from poly-culture by the need of a sequential direct flux of waste materials between the culture units containing each species; on a third stage (C) there is temporary integration, that means a species replacement into the same contention site, benefiting from waste materials produced by species from previous stockings, and finally, on a fourth stage (D), aqua-silviculture is conducted in sequential practices.

Compared to extensive integrated culture, intensive integrated culture practices rely on the inputs for the rearing of target species being "fed" and their waste materials are transferred and made available to extractive species.

Integrated multi-trophic aquaculture refers to the explicit incorporation of species from different trophic positions or nutritional levels in the same system. It differs from aquatic polyculture practice, which simply is the co-culturing of different fish species in the same trophic level. It is usual that integrated multi-trophic aquaculture practices are conducted in marine environments involving joint aquaculture of fed species, usually fish, together with extractive species such as bivalves and/or macro algae. Fed aquaculture species, such as finfish or shrimp, are combined, in the appropriate proportions, with organic extractive aquaculture species, such as suspension feeders, deposit feeders or herbivorous fish, and inorganic extractive aquaculture species, such as seaweeds. Integrated multi-trophic aquaculture can be applied either in open or in closed systems, or it can be applied in sea or freshwater systems as well. It is important to note that in this kind of systems appropriate organisms must be chosen based on their function in the system and for their economic value or potential. Integrated multi-trophic aquaculture objectives are, among others, the production of additional species, the reduction of waste emission, the improvement of culture environment recirculation, habitat preservation, the prevention of harmful materials, the removal of pest species, or seed from unwanted spawning, and the improvement of growth in target species. Benefits are linked to objectives, and these are, among others, effluent bio-mitigation, disease control, increased profits through diversification, increased profits through obtaining high prices and improvement of local economy.

Nutrient retention capacity, especially for nitrogen, is usually low and variable in fish and shrimp farming, resulting in significant releases of both dissolved and particulate wastes. Generally, for temperate regions less than ⅓ of the nutrients added through feed are removed by harvesting in intensive fish farming. Similarly, retention capacity for nitrogen in some tropical fish species, being fed conventional diets, varied between 20-50% and in relation to phosphorus which has a range between 15-65%. In short, the release of waste and the nutrients in the waste mainly depend on each species, feeding level, feed composition, fish size, temperature and developmental conditions, among others.

BRIEF DESCRIPTION OF THE INVENTION

The present invention presents a system and method for the preservation, growth and rearing of a primary, secondary and tertiary species, wherein the primary species develops by means of an intensive integrated multi-trophic aquaculture system and unfolds into a semi-intensive or extensive monoculture system, while secondary and tertiary species develop by means of the same integrated multi-trophic aquaculture system in a semi-intensive, or at least in an extensive way. More specifically, the present invention relates to a system and method for growing out different species through an initial, closed or semi-closed, intensive or semi-intensive integrated multi-trophic aquaculture system and, partially, through a subsequent open intensive, semi-intensive or extensive unfolding system, which is carried out in floating cages at estuaries, marshes, mangroves or similar, where estuaries, marshes, mangroves or similar are used as filter systems. Both production systems are integrated in a single system with a common origin for the primary species, from which the first system unfolds at a first stage; specifically, the water from the primary species continues in the first system and living organisms of the primary species unfold to a second system.

The first system, which is an integrated multi-trophic aquaculture system, consists in an initial closed or semi-closed intensive sub-system for a marine species, preferably a carnivore, a primary species with high commercial value, followed by a subsequent closed or semi-closed semi-intensive sub-system for a preferably omnivorous and saltwater-resistant, secondary species with medium commercial value, and a final closed or semi-closed semi-intensive or extensive sub-system for a tertiary species with high commercial value, preferably a filter feeder and detrivorous aquatic organism. For the first sub-system, external food is provided, possibly textured food, which provides the totality of their nutrient requirements; high quality, substantially clean water is also provided. Water flows from the first intensive sub-system to the third sub-system by means of the second sub-system; organic matter accumulates on each one of the sub-systems and is used as nourishment for the next sub-system, decreasing the feed conversion rate for each subsequent sub-system. Specifically, residual water from the first sub-system, which contains, among other things, food remains which the primary species did not consume, waste material, feces and phytoplankton, is used for the culture of the secondary species. Similarly, residual water from secondary species, enriched with waste material from the secondary species, which promotes phyto and zooplankton growth, is used by the tertiary species as nourishment and pro-biotic; water quality requirements for this species has lower standards considering specific density, where tertiary species uses residual water enriched by secondary species to reduce its external food consumption and raise its performance as a consequence of the waste and pro-biotic material in the system.

Once the primary species attains the first target weight in the first sub-system of the initial system, this initial system unfolds into a second external system, which consists of rearing the marine primary species inside cages in an extensive or semi-intensive open system. While the first sub-system of the initial system is an intensive one, and is used for developing the primary species from post-artemia stage to the size corresponding to the first target weight, the second system is an extensive or semi-intensive open system and is conducted from the first target weight to the commercially marketable second target weight. The first subsystem of the initial system has a density varying between 35 and 55 kg/m$^3$, and consists of portable tanks with a geo-membrane, an aeration support system and constant water flow, with a daily water re-change above 500%. The cage sub-system of the second system is either semi-intensive or extensive, wherein floating cages are placed at lagoons, marshes or estuaries, preferably coastal lagoons or mangroves, and have a biomass density ranging from 15 to 30 kg/m$^3$, more preferably from 18 to 23 kg/m$^3$, so it effectively shifts from an intensive system to a semi-intensive or extensive system. Lagoons, marshes or estuaries are preferred for the second system, especially coastal lagoons, estuaries or mangroves, since the biodiversity and natural water flow in the lagoon can allow the system to work without electrical energy or the pumping of water, as the lagoon can also function as an aeration system and partially as a filter. In order to fulfill this, collector-bearing floating cages have been specifically designed, which decrease organic matter emissions into the lagoon and, as a consequence the contamination to the entire system is reduced. During this sub-system of the second system, rearing time varies between periods of 1.5 and 4.5 months, more preferably between 2.5 and 3.5 months, and even more preferably between 2.8 and 3.2 months so that the marine primary species with high commercial value can reach its commercially marketable second target weight.

The combination of these two technologies, namely, the integrated multi-trophic aquaculture and the unfolding into the lagoon, allows us to obtain optimum conversion rates and optimum annual harvest per hectare, compared to commonly used production models. Specifically, price per kilo can be reduced up to 17% in light of the combination of technologies, compared to technologies known in prior art. The main benefit of this technology combination is to produce primary species as well as secondary and tertiary species, where the latter exploit the inputs and residual water from the primary species, so that this gradual exploitation is reflected in the reduction of the feed conversion rate and, as a consequence, a lower cost of production per hectare. Through this proposed combined system, it is possible to increase production volume, decrease maintenance expenses, and optimize water quality, land use, nutritional cycle and lower the use of electric energy. Additionally, another benefit is the primary species reaching optimal growth in half the time than it takes through the regular intensive system.

Therefore, an aspect of the present invention is to obtain a combination of an initial system of integrated multi-trophic aquaculture with a subsequent semi-intensive or extensive unfolding system into cages.

Another aspect of the invention, is to obtain a combination of at least three different species in a single aquaculture system, wherein at least two species are raised and reared in an initial integrated multi-trophic aquaculture system, at least one species is raised at the initial integrated multi-trophic aquaculture system and transported to a second system of external unfolding, and at least two species are raised solely in the initial integrated multi-trophic aquaculture system.

One additional aspect is to obtain at least two marine species with high commercial value and one species with medium commercial value in the same aquaculture system.

BRIEF DESCRIPTION OF THE FIGURES

The present invention will be understood when referenced with the following detailed description in conjunction with the following figures. Additionally, the previous aspects and other aspects shall be more clearly understood when referenced with the detailed descriptions along with the following figures.

FIG. 5 is a flow chart showing the different stages of the integrated multi-trophic aquaculture system used by the present invention.

FIG. 6 shows a reservoir pond and the intensive ponds and, more specifically, it shows the difference in height between them.

FIG. 7 shows a reservoir pond, the intensive ponds and residual water collected in the intensive ponds at secondary species ponds.

DETAILED DESCRIPTION OF THE INVENTION

Definitions

Figure 1:
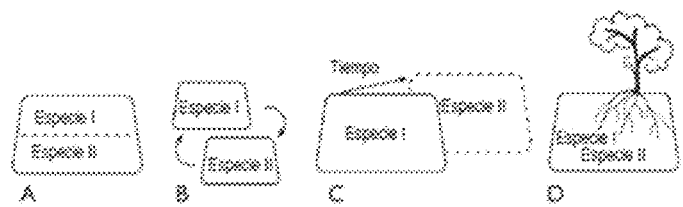
FIG. 1 shows a flow chart of an integrated aquaculture system from prior art.
Figure 2:
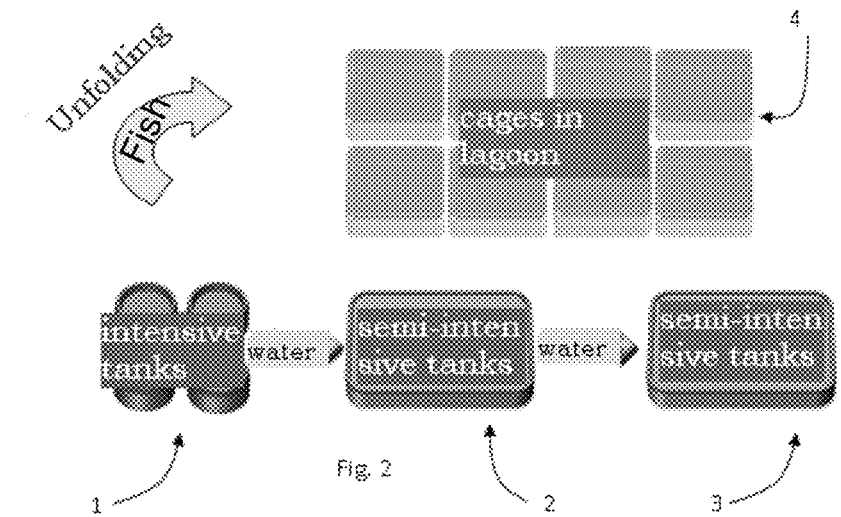
FIG. 2 shows a flow chart of the technology combination proposed by the present invention.

Residual water-Water in a sub-system which goes from a first or second sub-system to a second or third sub-system, respectively; it contains, among other things, food remains which primary species did not consume, waste material, feces and phytoplankton, used for the culture of the secondary or tertiary species depending on the case.

External food. User-provided food, possibly textured, such as balanced pellets for the species or organism specifically or generally.

About. The use of the term "about" provides a specific additional range. The term is defined as follows: the additional range provided by the term is approximately ±10%. As an example, but not in a limitative manner, if it states "about between 30 and 40 litters", the exact range falls between 27 and 44 liters, or between 33 and 44 liters, or between 27 and 36 liters, or it could be between 33 and 36 liters as well. Any possibility described previously is included within the term "about".

Biomass density. Density, measured in $kg/m^3$, of a particular organism in relation to the space in the system, tank, cage, etc.

Rearing (as stage). An organism's post-artemia stage until the point where it is marketable; in other words, from the first target weight or size to a second target weight or size.

Primary species. A marine organism with high commercial value, preferably a carnivore; as an example, but not in a limited manner, an organism of the Lutjanidae, Centropomidae, Carangidae, Rachycentridae, Sciaenidae, Serranidae, Sparidae, Acipenseridae, Sciaenidae, Anguillidae, Moronidae, Salmonidae, Scophthalmidae families.

Secondary species. An aquatic organism with medium commercial value, preferably one which endures saltwater and which is omnivorous; as an example, but not in a limited manner, to an organism of Cichlidae, Mugilidae, Cyprinidae, Ictaluridae, Chanidae, Clariidae, Pangasiidae families.

Tertiary species. A marine organism with high commercial value, ideally a filter feeder and a detritivorous one; as an example, but not in a limited manner, to an organism of the families Penaeidae, Palaemonidae, Parastacidae, Grapsidae, Palinuridae, Pectinidae, Cambaridae, Portunidae and bivalve mollusks such as Veneridae, Ostreidae, Mytilidae, and other cultivable species such as weeds Solieriaceae, Bangiaceae and Laminariaceae.

First target weight or size. The appropriate weight an organism needs to be in order to be stocked. In weight, this first target can be defined as about between 35-65 grams, preferably 45-60 grams, and even more preferably about between 48-55 grams.

Second target weight or size. The appropriate weight an organism needs to be in order to be harvested or to reach a marketable size. This depends on the type of organism and on the market for the particular organism.

Open system. A system where inputs and outputs of water are provided by the natural flow of water, as in a lagoon, estuary, marsh or similar. An open system is exposed to the natural elements.

Closed system. A system where a specific input for water is provided, whether it is residual or clean, with its corresponding output for residual water. A closed system is not exposed to the natural elements.

Extensive system. A system where biomass density is proportionally low; usually an open system, where bio-chemicals are used rarely or not at all.

Intensive system. A system where biomass density is proportionally high; usually a closed or semi-closed system, where bio-chemicals are frequently used.

Semi-closed system. A system where a specific input for water is provided, whether it is residual or clean, with its corresponding output for residual water. A semi-closed system is exposed to the natural elements.

Semi-intensive system. A system where biomass density is proportionally moderate; usually a closed or semi-closed system, where the use of chemicals is medium to low.

Multico. Integrated Multi-Trophic Aquaculture.

The following description is made in relation to FIGS. 1 to 8. The present invention presents a system and method for the preservation and rearing of a primary, a secondary and a tertiary species through an integrated multi-trophic aquaculture system 20, an unfolding system 30 into cages for the primary species and a Multico system for the secondary and tertiary ones. More specifically, the present invention relates to a system and method for growing out different species through an initial Multico system 20 and a second semi-intensive or extensive system 30, unfolded from the initial system, the second system is carried out in floating cages 5 in an open system. Both production systems 20, 30 integrate into a single system with a common origin for the primary species and, on the other hand, residual water from the primary species in the initial multico system 20 keeps being used in the initial system 20. When the living organisms from the primary species, reach their first target size, they are transferred to the second system 30 for their subsequent rearing in the semi-intensive or extensive open system.

The initial integrated multi-trophic aquaculture system 20 consists of an intensive first sub-system for a primary species. The first sub-system is carried out in ponds 1, therefore it is a closed or semi-closed system. The first sub-system of the initial system 20 is followed by a second sub-system, which is semi-intensive for a secondary species; it is carried out in ponds 2 which are different from the first intensive ponds, so that it is a closed or semi-closed system. Finally, subsequent to the second semi-intensive sub-system, there is a third semi-intensive or extensive sub-system for a tertiary species, carried out in ponds 3 which differ from the ponds 2 of the second sub-system; this is also a closed or semi-closed system.

For the first sub-system of the initial system 20, at the pond 1 stage, external food, which provides the totality of nutritional requirements for the primary species, and substantially clean water quality, is provided. Water flows from the first sub-system 1 to the third sub-system 3; organic matter accumulates in the residual water in each one of the sub-systems 1, 2, 3 and it is used as nourishment for the next stage, decreasing the feed conversion rate for each subsequent sub-system 2, 3. Specifically, residual water from the first sub-system 1 is used for the culture of the secondary species in the second sub-system 2. The food for the secondary species in the second sub-system 2 is a mixture of residual water from the first sub-system 1 and external food. In turn, residual water from secondary species in the second sub-system 2, enriched with waste material from the secondary species, thereby promoting phyto and zooplankton growth, is used by the tertiary species in the third sub-system 3 as food and probiotics; water quality requirements for this species has lower standards considering specific density, since tertiary species uses enriched residual water to reduce its external food consumption and raise its performance as a consequence of the presence of waste and probiotic material in the system. Specifically, the system could eliminate the use of external food in the third sub-system 3.

Figure 4:
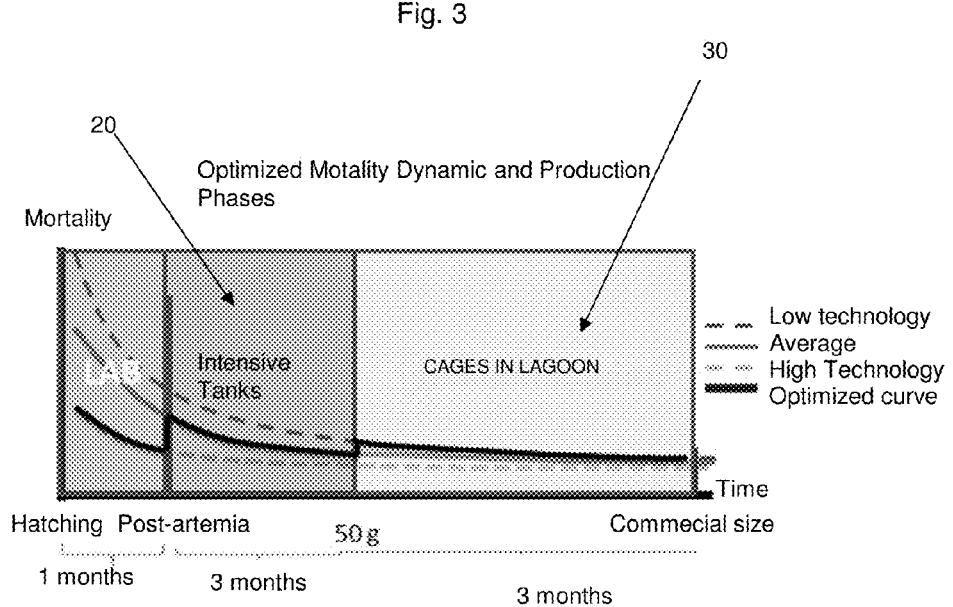
FIG. 4 is a representative graph of the production system of the present invention, considering production phases and mortality.
Figure 8:
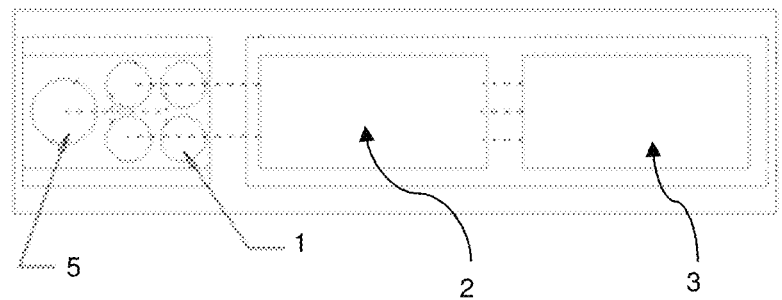
FIG. 8 is a top view of the first system proposed in the present invention.
Figure 9:
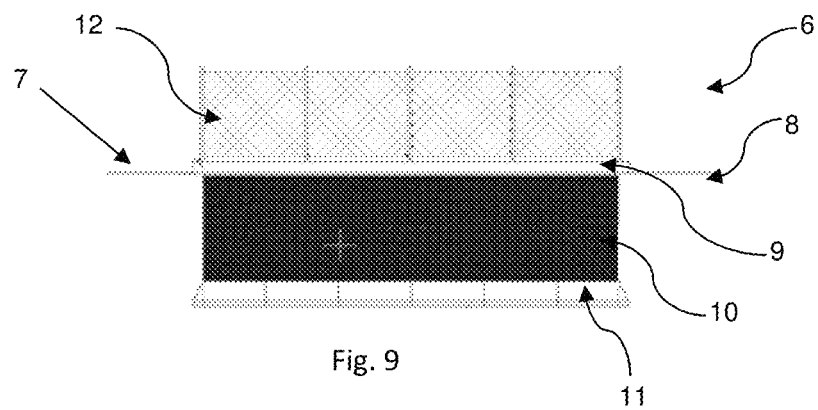
FIG. 9 is a lateral view of one of the floating cages to be used in the present invention.

The first sub-system is used for raising the primary species from post-artemia stage to the first target weight or size, as shown in FIG. 4. The approximate duration of this first stage is between 1.5 and 4.5 months, more preferably between 2.5 and 3.5 months, and even more preferably between 2.8 and 3.2 months. The first subsystem has a density biomass about between 35 and 55 kg/m$^3$, more preferably about between 48 and 55 kg/m$^3$, and even more preferably about between 48 and 53 kg/m$^3$. It consists of portable tanks with geomembrane, aeration support systems and constant flow of water, with a daily water re-change above 500%; more specifically, between 5 and 6 times a day, more preferably between 5.3 and 5.5 times a day, and even more preferably between 5.40 and 5.45 times a day approximately. The preferred pond 1 volume is between 3 and 7 m$^3$, more preferably between 4 and 6 m$^3$, and even more preferably between 4.5 and 5.2 m$^3$. The preferred aeration system for the first sub-system is by means of the use of bubbles.

The second sub-system has a biomass density varying between 10 and 25 kg/m$^3$, more preferably between 15 and 20 kg/m$^3$, and even more preferably between 17 and 18.5 kg/m$^3$. The second sub-system is used for raising the primary species from the post-artemia stage to the second target weight or size. Tanks 2 in the second sub-system are tanks with lined bottoms. The preferred pond volume varies between 250 and 400 m$^3$, more preferably between 300 and 350 m$^3$, and even more preferably between 310 and 350 m$^3$. The approximate duration of this stage for the second sub-system is between 4 and 8 months, more preferably between 5 and 7 months, and even more preferably between 5.5 and 6.2 months. Second sub-system ponds include, aeration support and constant flow of water, with a daily re-change under 50%; more specifically, between 0.3 and 0.5 times a day, more preferably between 0.3 and 0.45 times a day, and even more preferably between 0.32 and 0.35 times a day approximately. The preferred aeration system for the second sub-system is by means of the use of paddles. The production of the secondary species has benefited from the mentioned configuration, as shown in Table 1, where production of tilapia through the present invention and predominant production models in Mexico are compared.

TABLE 1

|  | National Average | Present invention | |
|---|---|---|---|
|  |  | Without Multico | With Multico |
| FCA | 1.8 | 1.6 | 1.3 |
| Density (m$^3$) | 15 | 50 | 50 |

TABLE 1-continued

| | National Average | Present invention | |
| | | Without Multico | With Multico |
| --- | --- | --- | --- |
| Ton/Ha | 20 | 288 | 288 |
| Price per kilo | 16.7 | 16.61 | 13.91 |
| Mortality | 47 | 20 | 20 |

The third subsystem has a biomass density between 1 and 3 kg/m$^3$, more preferably between 1.5 and 2.5 kg/m$^3$, and even more preferably between 1.6 and 1.9 kg/m$^3$, approximately. The third sub-system is used for raising the primary species from the post-artemia stage to the second target weight or size. Tanks 3 in the third sub-system are tanks with lined bottoms. The preferred pond volume about between 250 and 400 m$^3$, more preferably between 300 and 350 m$^3$, and even more preferably between about 310 and 350 m$^3$. The approximate duration of this stage for the third sub-system varies about between 3 and 6 months, more preferably between 4 and 6 months, and even more preferably approximately 5 months. Third sub-system ponds include aeration support and constant flow of water, with a daily water rechange under 50%; more specifically, between 0.3 and 0.5 times a day, more preferably between 0.3 and 0.45 times a day, and even more preferably 0.34 times a day approximately. The preferred aeration system for the third sub-system is by means of paddles.

Figure 3:
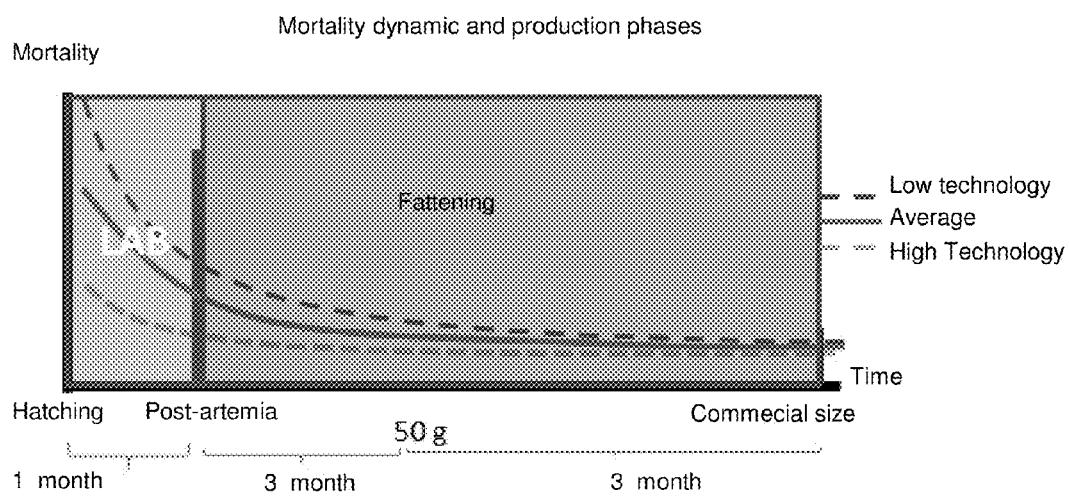
FIG. 3 is a representative graph of a production system from prior art, considering production phases and mortality.

On the other hand, the second system 30, unfolded from the first system 20, is carried out at an open system and it is a semi-intensive or an extensive system. Sea fish mortality is particularly dynamic. Mortality risk is especially high during the first stages of growth; this risk decreases as the organism reaches larger sizes. In aquaculture, this risk is presented in different ways, depending on culture technology; the better the technology, the lesser the mortality risk. Intensive schemes, relying on water quality management technologies, oxygen concentration, control of ammonia and other contaminants produced by the system are effective for controlling mortality during the life of the fish, as shown in FIG. 3. When organisms reach the post-artemia stage, they are stocked and enter the rearing phase. Stocking of the primary species is carried out based on about 750-1500 organisms per m$^3$, more preferably 850-1100 organisms per m$^3$, and more preferably about 1000 organisms per m$^3$. When the primary species organisms reach the first target size, they are transferred to a semi-intensive or extensive system with floating cages at an open system, such as a lagoon, estuaries, marshes or similar. This sub-system from the second system does not require electrical power nor expert supervision; it only requires food and basic care until the organisms reach the second target weight. This is possible thanks to production being based on the carrying capacity of the open system in which floating cages are installed; in other words, the carrying capacity of the open system sets the maximum amount, in tons, at which the open system can provide nutrients, oxygen, and required purity without affecting the natural ecosystem of the open system. Mortality rates and optimized production phases are shown in FIG. 4. The sub-system 4 is located at an open system, preferably lagoons, estuaries, and marshes or similar, and even more preferably coastal lagoons, estuaries or mangroves. The unfolded sub-system 4 has a density varying between 15 and 30 kg/m$^3$, more preferably between 16 and 24 kg/m$^3$, and even more preferably between about 16 and 21 kg/m$^3$. Lagoons, estuaries or marshes are preferably used for the second system, and more preferably coastal lagoons, estuaries or mangroves, since biodiversity and natural water flow can enable the system to work without electrical energy or water pumping, specifically considering that the lagoon can also function as an aeration system and that said open systems work as a filter. In order to fulfill this, specific floating cages have been designed, which through a collector, decrease organic matter emissions into the open system, and therefore, whole system contamination is reduced. During this sub-system of the second system, rearing time varies between 1.5 and 4.5 months, more preferably between 2.5 to 3.5 months, and even more preferably every 3 months approximately, for the primary species to reach the second target weight. All the aforementioned calculations directly depend on the carrying capacity of the open system, since increasing biomass density affects the stability of the open system, specifically the lagoon system, and the latter provides nutrients and required purity to carry out the rearing process of the primary species; also, aeration amount and waste collection capacity of the open systems are limited.

FIG. 5 shows a general scheme of the operation process for the primary, secondary and tertiary species.

Stocking begins with fingerling acquisition, which can be conducted through the collection of the organisms at a lagoon, through a transfer from a technological center or through their purchase from a fingerling production hatchery. In the case of organisms being collected at a lagoon, it is important to take into account external food adoption, since they are not used to eating external food. Mortality ratios during this first stage of stocking are about 10-30%, usually because fingerlings do not accept external food. When buying and transferring fingerlings, the organisms are received in low-temperature plastic bags with oxygen; these organisms are trained to eating external food, so mortality rate decreases. The basic process for receiving consists of having ponds 1 prepared in advance according to the suppliers water specifications; communication with the supplier is constantly maintained during the transportation, in order to monitor water conditions of the organisms and prepare everything for their acclimatization. Once received, health conditions of the fingerlings are inspected, and the acclimatization process begins, starting with temperature; after which, water is gradually mixed in order to homogenize the other physical-chemical parameters such as pH or salinity.

In the case of the secondary and tertiary species, the organisms are received in similar conditions from production laboratories at Mexico or from abroad; and in the same way, they undergo an acclimatization process before being taken into the culture ponds 2, 3.

For the first rearing stage in tanks 1 of the primary species, a specific amount of organisms from the primary species are stored, preferably between 750-1500 organisms per cubed meter, more preferably between 850-1100 and even more preferably approximately 1000 individuals per cubed meter, approximately; these organisms weight approximately 2 to 5 grams each, and they are stored in tanks ranging between 3 to 7 m$^3$, with between 1-2.5 horsepower for aeration to support intensive culture. More than approximately 800 kg of food is supplied in order to rear them to the first target size. Rearing process consists, basically, of feeding and maintaining the optimum environmental conditions for rearing, from their fingerling stage to the first target size or larger/higher, depending on the species being cultured. Food is determined according to the biomass density of the organisms in the pond 1, as a result of programmed biometrics where growth and health conditions are measured. There are food charts with suggestions for different species of fish according to the organism's weight. Measurements are made at least twice a day to obtain information about physical-chemical conditions of the water and analyze oxygen concentration, pH, temperature, salinity, conductivity, etc. Based on these conditions, decisions about the necessary amount of water re-change, aeration and food are made. Constant supply of aeration and good quality water are important issues at this stage, along with keeping a rigorous food regime in order to stimulate the organisms' growth.

At the secondary and tertiary species rearing stage in tanks 2, 3, residual water from the intensive culture units of the primary species is used; secondary and tertiary species will not be transferred to the open system at all, and on the contrary, they will undergo their rearing process within the same ponds 2, 3 where they are stocked. The first one to receive residual water from the primary species is the secondary species. In reaching its second target size, secondary organisms are harvested with an expected mortality of 20% from their stocking to harvesting. Finally, residual water from the secondary species is used in the rearing of the tertiary species, which is harvested when it reaches its second target size, with an expected mortality of 20% from their stocking to their harvesting.

Once the primary species reaches its first target size, it is transferred into the open system in bags inflated with pure oxygen. This method provides several hours for the transfer, and facilitates transportation in any vehicle, including by boat, which will take them to the final site in cages. The cages are prepared to receive the primary organisms, which will again carry out the acclimatization process in order to avoid sudden temperature and environmental conditions changes. Organisms are distributed among the cages according to the specific density of each species.

Once the primary species is transferred, organisms are harvested in floating cages. Fish grow out from the first target size to the second target size in an estimated period of time preferably varying between approximately 2.5-3.5 months. The unfolding of production from tanks 1 into the cages promotes growth of the species due to increase in space and reduction of densities. In an open system, the rearing process requires external food supply and the carrying out of programmed biometrics in order to analyze the organism's growth and health conditions. The open system provides the remaining environmental services for the preserving of the organisms.

When the organisms reach their second target size, they are harvested, counted, sorted by size and transferred to land. This last condition applies for the primary, secondary and tertiary species.

The combination of these two technologies, namely, integrated multi-trophic aquaculture and the unfolding into cages allows us to obtain optimum conversion rates and optimum annual harvest by hectare, compared to commonly used production models. Specifically, price per kilo can be reduced by up to 7% in view of the technology combination, compared to technologies known in prior art. The main benefit of this technology combination is to produce primary species as well as secondary and tertiary species, where the latter ones take advantage of the inputs and residual water of the primary species, so that this gradual taking advantage is reflected as a feed conversion rate reduction and, as a consequence, a lower cost of production per hectare. Through this proposed combined system, it is possible to increase production volume, decrease maintenance expenses, optimize water quality, land use, nutritional cycle and electrical energy use. For example, regarding optimization of land, an significant productive scale can be reached with a limited land extension, since through the combination of both systems, the area required is approximately 610 times less than the area than needed for traditional systems. The feed conversion rates for the three species in both systems is presented in Table 2:

TABLE 2

| Feed conversion rate | | |
|---|---|---|
| | Present invention | Traditional model |
| Primary species | 1.6 kg food/kg product | 1.6 |
| Secondary species | 1.3 kg food/kg product | 1.6 |
| Tertiary species | 1.0 kg food/kg product | 2.0 |

Furthermore, water consumption and energy pumping can be reduced to approximately a third of the one needed/used in traditional systems, as is shown in Table 3, taking into account the pumping of water in a well 25 m in depth:

TABLE 3

| Water consumption | Proposed model | | Traditional model | |
|---|---|---|---|---|
| Primary species | 75.7 l/min | 542 $/month | 75.7 l/min | 542 |
| Secondary species | 0.0 l/min | 0 $/month | 75.7 l/min | 542 |
| Tertiary species | 0.0 l/min | 0 $/month | 75.7 l/min | 542 |
| Total | 75.7 l/min | 542 $/month* | 227.1 l/min | 1626 |

The following description is made referencing FIGS. 6 to 9.

The basic production unit is supplied with water through the use of two wells, one with freshwater and one with salt water; these two wells have a pumping system with a maximum capacity between 200 and 350 liters by minute, more preferably between 300 liters by minute approximately, having a power consumption during its operation of approximately 4.9 watts by pump. Water obtained from the wells goes to the reservoir pond 5, which has a storage capacity between 20 and 70 $m^3$, more preferably between 25 and 50 $m^3$, and even more preferably between 35 and 42 $m^3$, of water, which allows having constant water flow for at least 8 hours and more preferably between 8 and 12 hours. Reservoir pond 5 is located at a specific height above ground level, preferably between 1 and 2 meters high, enabling water flow to the entire production unit by gravity.

Alternatively, instead of a reserve tank, it could consist of a water distribution system by means of elevated concrete channels, similar to an aqueduct, where the system carries water to each tank, whether it be of the primary, secondary or tertiary species from the pumping trough by means of gravity. The water distribution system has the capability of distributing water at a volume between 2 to 5 $m^3$/min, preferably between 3 to 4 $m^3$/min, and even more preferably between 3.6 to 4 $m^3$/min. Given the above, it is distributed to approximately 4 groups, each group with approximately 32 tanks.

For the first stage of primary species rearing, the base production unit has between 3 and 6 ponds 1, more specifically between 4 and 5 ponds 1, measuring between 2 and 4 meters in diameter, more specifically measuring between 2.4 and 3 meters in diameter, with a capacity between 3 and 7 $m^3$ each, and more preferably between 4.5 and 5 $m^3$ each. Said ponds 1 are used for the intensive growing out of primary species fish. Water supply for the intensive ponds is achieved through PVC pipes schedule 80 with a diameter measuring between 1.9 cm (0.75 in) and 2.54 cm (1 in), which ultimately will be connected to each of the ponds 1 using PVC pipes measuring between 1.27 cm (0.5 in) and 1.9 cm (0.75 in) in diameter. The ponds 1 are supplied with high quality water flowing at 15-20 l/min, preferably at 17-19 l/min; each pond tolerates water re-change between 5 and 6 times a day, more specifically, between 5.3 and 5.5 times a day, and even more preferably between 5.4 and 5.45 times a day. Pond water is aerated through the use of two blowers varying between 1 and 2.5 Hp, which supply between 1.2 and 1.55 m$^3$/min of air per pond 1 and consume between approximately 3 and 3.52 kWatts per production unit. Residual water from this pond 1 is collected and transported to the secondary ponds with PVC pipes schedule 80 with different measurements.

In order to take advantage of residual water from the ponds 1 of the primary species, it is poured into a pond set in soil lined with geomembrane which is used for raising the secondary species. This pond 2 has a volume varying between 250 and 400 m$^3$, preferably between 300 and 350 m$^3$, and even more preferably between 310 and 350 m$^3$ this pond can tolerate a density varying between 10 and 25 kg/m$^3$, more preferably between 15 and 20 kg/m$^3$, and even more preferably between 17 and 18.5 kg/m$^3$. Water flow in this pond 2 varies between 60 and 90 l/min, more preferably between 70 and 80 l/min, and even more preferably between 74 and 76 l/min, which translates into a daily water re-change varying between 0.3 and 0.5 times a day, more specifically between 0.3 and 0.4 times a day, and even more preferably between 0.32 and 0.35 times a day approximately. In order to promote water aeration, the pond 2 has a paddle aerator varying between 0.75 and 1.5 Hp which consumes between 1.5 and 2.5 kWatts. This pond 2 is located next to ponds 1, separated by a corridor measuring between 2.4-2.8 meters.

Residual water from the pond 2 of the secondary species feed a third pond 3 with the same characteristics, but it will be used for raising a tertiary species. As in the previous pond 2, water will be aerated by paddles varying between 0.75 and 1.5 Hp and with the same power supply requirements. This pond 3 has the same flow of water than that of the previous pond 2. Residual water from this pond 3 is poured into a sedimentation pond (not shown) for its subsequent reintegration to the environment.

When organisms from the primary species reach their first target weight or size, they are transferred into cages in the open system so they can continue their development; the transportation of the fish to the open system is carried out in traditional ways, such as polyurethane bags with an approximate density of 100 fish per bag, so the amount of fish sent to the cages is controlled; however, other methods known in prior art can also be used for the transportation of the organisms, such as the one provided in U.S. Pat. No. 6,557,492. Floating cages 6 are located in the open system, where between 20 and 26 cages are required, more specifically between 23 and 26 cages with sizes varying between approximately 3 m×3 m and 4.5×4.5 m, with an area which varies between 400 and 500 m$^2$, more preferably between 470 and 500 m$^2$, in the open system. Said cages have a biomass density varying about between 15 and 30 kg/m$^3$, more preferably between 18 and 23 kg/m$^3$, and more preferably between about 19 a 20 kg/m$^3$.

The floating cages are essentially composed of two parts; one part which is located above water surface 8, and another which is located underwater. In the first part, a corridor 7 which allows the operators to walk on said floating cages 6. Throughout the whole cage 6, at least one floater 9 is provided, which can occupy the whole area of the cage 6, or it can simply surround the cage 6. A net 10 is fixed to the floater 9 in its upper part, surrounding and being near the perimeter of the area of the floater 9. On the other hand, the lower part of the net 10 is fixed to a submersible structure 11, in which the net is fixed, surrounding and being near the perimeter of the area of the submersible structure 11. The submersible structure 11 and the float 9 have a substantially similar area, while the net 10 can have a surface area smaller than or equal to the one of the submersible structure 11 and the float 9. On the other hand, the upper part of the float 9 can be provided with a wired netting 12 in order to prevent entry by non-authorized users.

Alterations to the structure described above could be foreseen by those with expertise in the field. However, it must be understood that the present description is related with the preferred embodiments of the invention, and is provided solely for illustrative purposes and must not be constructed as a limitation of the invention. All modifications which do not depart from the spirit of the invention are included within the body of the attached claims.

What is claimed is:

1. An aquaculture system comprising:
    an integrated multi-trophic aquaculture system (multico) for a primary, secondary and tertiary species, wherein the multico system for the primary species is a closed or semi-closed intensive system; and
    an unfolding system for the primary species once having reached a first target weight or size of said primary species in the multico system, wherein the unfolding system comprises a semi-intensive or extensive open aquaculture system,
    wherein the multico system for the secondary species is a closed intensive or semi-closed system,
    wherein the multico system for the tertiary species is a semi-intensive or closed extensive or semi-closed system;
    wherein the primary species is a high market value marine species,
    wherein the secondary species is a medium market value species and salt water resistant, and
    wherein the tertiary species is a high market value species.

2. The system according to claim 1,
    wherein the primary species is carnivorous and is selected from the family Lutjanidae, Centropomidae, Carangidae, Rachycentridae, Sciaenidae, Serranidae, Sparidae, Acipenseridae, Sciaenidae, Anguillidae, Moronidae, Salmonidae, Scophthalmidae;
    wherein the secondary species is omnivorous and is selected from the family Cichlidae, Mugilidae, Cyprinidae, Ictaluridae, Chanidae, Clariidae, Pangasiidae; and
    wherein the tertiary species is detrivorous and is selected from the family Penaeidae, Palaemonidae, Parastacidae, Grapsidae, Palinuridae, Pectinidae, Cambaridae, Portunidae, and bivalve mollusks such as Veneridae, Ostreidae, Mytilidae or other cultivable species such as weeds Solieriaceae, Bangiaceae y Laminariaceae.

3. The system according to claim 1,
    wherein the primary species is fed with about 800 kg of external food in the multico system;
    wherein the primary species is fed with external food in the unfolded system;
    wherein the secondary species is fed with a combination of residual water from the primary species and external food; and
    wherein the tertiary species is fed with residual water from the secondary species.

4. The system according to claim 1,
    wherein the time for remaining in the multico system for the primary species varies between about 1.5 months to about 4.5 months, wherein the first target weight of the primary species varies between about 35 and about 65 grams, wherein the multico system of the primary species has a biomass density which varies between about 35 to about 55 kg/m³, the multico system of the primary species is carried out in a tank with a combined re-change between fresh and salt water varying between about 5 and about 6 times per day, and the tank of the primary species is oxygenated by means of aeration carried out by blowers;

wherein the time for remaining in the multico system for the secondary species varies between about 4 months to about 8 months to reach from the first post-artemia phase to a market weight or size, wherein the multico system of the secondary species has a biomass density which varies between about 10 to about 25 kg/m³, and wherein the multico system of the secondary species is carried out in a tank with a combined water re-change between about 0.3 to about 0.5 times per day, and the tank of the secondary species is oxygenated by means of aeration paddles; and wherein the time for remaining in the multico system for the tertiary species varies between about 3 to about 6 months to reach from the post-artemia phase to a market weight or size, wherein the multico system of the tertiary species has a biomass density varying between about 1 to about 3 kg/m³, and wherein the multico system of the tertiary species is carried out in a tank with a combined water re-change between about 0.3 to about 0.5 times per day, and the tank of the tertiary species is oxygenated by means of aeration paddles.

5. The system according to claim 4, wherein the primary species tank in the multico system is fed by a reserve tank with a capacity varying between about 20 to about 70 m³ and wherein the reserve tank lies at a height varying between about 1 and about 2 meters above the primary species tank.

6. The system according to claim 1,
wherein the open system is an estuary, marsh, lagoon, coastal lagoon or mangrove;
wherein the time for remaining in the semi-intensive or extensive unfolded open system for the primary species varies between about 1.5 to about 4.5 months to reach from the first size or weight to a market size or weight, wherein the semi-intensive or extensive unfolded open system has a biomass density which varies between about 15 to about 30 kg/m³, and
wherein the unfolded system of the primary species takes place in a floating cage.

7. The system according to claim 6
wherein the floating cage occupies a surface varying between about 400 to about 500 m2;
the floating cage comprises a first part above the water surface, a second part below the water surface, at least one floater, the first part surrounds and is near the floater, and wherein the second part is fixed surrounding and being near the floater, the second part being defined by a net which surrounds the second part and is fixed to a submergible structure.

8. An aquaculture system comprising:
a closed or semi-closed intensive system for an aquatic species; and
an unfolding system for the aquatic species once an initial target weight or size for said aquatic species is reached in the closed or semi-closed intensive system, wherein the unfolding system comprises a semi-intensive or extensive open aquaculture system,
wherein the time for remaining in the intensive closed or semi-closed system varies between about 1.5 to about 4.5 months wherein the first target weight of the aquatic species varies between about 35 and about 65 grams, wherein the closed or semi-closed intensive system has a biomass density which varies between about 35 to about 55 kg/m³, wherein the closed or semi-closed system is carried out in a tank with a volume varying between about 3 to about 7 m³, with a replenishment of a fresh and salt water combination with a flow varying between about 15 and about 20 l/min and the tank with the aquatic species is oxygenated by means of aeration by blowers;
wherein the open system is selected from among an estuary, marsh, lagoon, coastal lagoon or mangrove; and
wherein the time for remaining in the unfolded open semi-intensive or extensive system. varies between about 1.5 to about 4.5 months to reach from the first weight or size to a market weight or size, wherein said semi-intensive or extensive open system has a biomass density which varies between about 15 to about 30 kg/m³, and said unfolding system of the primary species is carried out in a floating cage.

9. The system according to claim 8, wherein the aquatic species is a carnivorous marine species with high market value selected form the *Lutjanus campechanus*, centropomidae or *Rachycentron canadum* group.

* * * * *